(12) United States Patent
Gliebe

(10) Patent No.: US 6,733,240 B2
(45) Date of Patent: May 11, 2004

(54) SERRATED FAN BLADE

(75) Inventor: Philip Roger Gliebe, Waynesville, OH (US)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 09/907,980

(22) Filed: Jul. 18, 2001

(65) Prior Publication Data

US 2003/0152459 A1 Aug. 14, 2003

(51) Int. Cl.7 .................................................. F01D 5/14
(52) U.S. Cl. ...................................................... 416/228
(58) Field of Search ............................. 416/228, 223 A, 416/223 R

(56) References Cited

U.S. PATENT DOCUMENTS

| 1,862,827 | A | * | 6/1932 | Parsons et al. | 416/228 |
| 3,215,172 | A |   | 11/1965 | Ardoin | |
| 3,365,126 | A | * | 1/1968 | Stoffer et al. | 416/228 |
| 3,403,893 | A | * | 10/1968 | Stoffer | 416/228 |
| 3,568,792 | A |   | 3/1971 | Urquhart | |
| 3,853,428 | A | * | 12/1974 | Hayden et al. | 415/119 |
| 4,089,618 | A | * | 5/1978 | Patel | 416/228 |
| 4,318,669 | A | * | 3/1982 | Wennerstrom | 415/119 |
| 4,830,315 | A |   | 5/1989 | Presz, Jr. et al. | |
| 5,074,376 | A | * | 12/1991 | Powell | 416/228 |
| 5,169,288 | A |   | 12/1992 | Gliebe et al. | |
| 5,533,865 | A | * | 7/1996 | Dassen et al. | 416/228 |
| 5,603,607 | A |   | 2/1997 | Kondo et al. | |

FOREIGN PATENT DOCUMENTS

| DE | 4208751 A | * | 11/1993 | B64C/11/18 |
| GB | 789883 |   | 1/1958 | |
| GB | 2289921 |   | 12/1995 | |
| JP | 63113101 A | * | 5/1988 | F01D/09/02 |

OTHER PUBLICATIONS

U.S. patent application Ser. No. 08/961794 (docket 13DV–12644).

* cited by examiner

Primary Examiner—Edward K. Look
Assistant Examiner—Igor Kershteyn
(74) Attorney, Agent, or Firm—Nathan D. Herkamp; Francis L. Conte

(57) ABSTRACT

A turbofan engine includes a row of fan blades disposed upstream from a row of stator vanes, and is powered by a core engine. The fan blades are serrated for mixing wakes therefrom to attenuate fan noise.

24 Claims, 3 Drawing Sheets

SERRATED FAN BLADE

BACKGROUND OF THE INVENTION

The present invention relates generally to gas turbine engines, and, more specifically, to noise attenuation in fans thereof In a turbofan gas turbine engine configured for powering an aircraft in flight, air is pressurized in a fan and discharged for producing propulsion thrust. A portion of the fan air is channeled into a core engine including a multistage axial compressor that further pressurizes the air which is then mixed with fuel and ignited in a combustor that discharges hot combustion gases downstream in turn to high and low pressure turbines. The high pressure turbine powers the compressor, and the low pressure turbine powers the fan.

The fan rotor blades are substantially larger in outer diameter than the compressor rotor blades for moving a large volume of air to create propulsion thrust. The row of fan blades is surrounded by a fan nacelle which is typically supported to the core engine by a row of supporting radial struts. And, disposed downstream from the fan blades is a row of stator vanes inside the fan nacelle for deswirling the fan air prior to discharge through the fan nozzle or outlet. In an alternate configuration, the fan vanes and struts may be integrated in common vane-strut members.

A primary source of fan noise for aircraft engines is the interaction of the wakes shed from the fan blades with the fan vanes disposed downstream therefrom. The row of fan blades rotates relative to the stationary fan vanes with a blade passing frequency in which each of the blade wakes produces a corresponding non-uniformity in velocity at the row of fan vanes. The rotor wake-vane interaction produces unsteady loading on the stator vanes, which in turn produces pressure waves that propagate upstream and downstream as sound radiating at the blade passing frequency and its harmonics.

Furthermore, turbulence in the fan wakes also interacts with the downstream stator vanes generating unsteady loading and corresponding sound waves at a wide spectrum of frequencies related to the energy spectrum of the wake turbulence itself.

Accordingly, the aerodynamic interaction between the fan blades and vanes creates substantial fan noise during operation which must be limited to comply with various governmental noise regulations. Fan noise may be typically reduced by increasing fan diameter and reducing fan tip speed and pressure ratio. Fan noise may also be decreased by increasing the axial spacing between the fan blades and vanes. And, fan noise may also be reduced by preferentially selecting the relative number of blades and vanes in each row to provide cut-off of the blade passing frequency tones. The fan nacelle also typically includes noise absorbing acoustic liners for additional noise attenuation.

However, these noise attenuation techniques affect engine performance, affect engine size and weight, and vary in effectiveness.

Accordingly, it is desired to provide an improved turbofan for noise attenuation.

BRIEF SUMMARY OF THE INVENTION

A turbofan engine includes a row of fan blades disposed upstream from a row of stator vanes, and is powered by a core engine. The fan blades are serrated for mixing wakes therefrom to attenuate fan noise.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
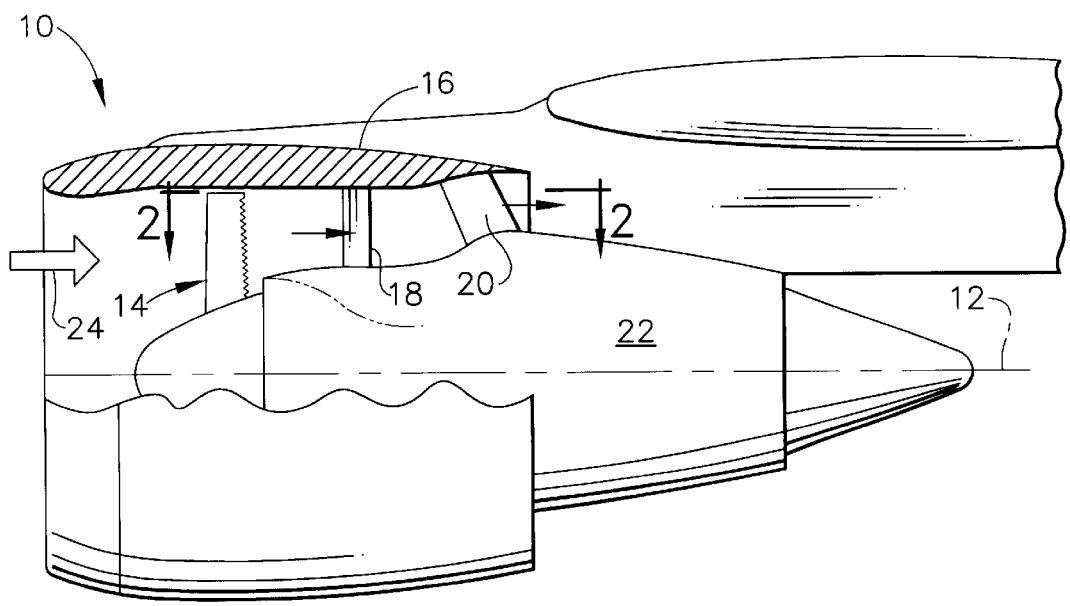
FIG. 1 is a partly sectional axial view of a turbofan gas turbine engine mounted to an aircraft wing and including an improved fan in accordance with an exemplary embodiment of the present invention.

Illustrated in FIG. 1 is a turbofan gas turbine engine 10 suitably mounted by a pylon to the wing of an aircraft for powering the aircraft in flight. The engine is axisymmetrical about a longitudinal or axial centerline axis 12 and includes a row of fan rotor blades 14 mounted inside a surrounding fan nacelle 16. Disposed immediately downstream from the fan blades is a row of fan stator vanes 18 followed in turn by a row of supporting struts 20 which mount the fan nacelle to a core engine 22.

The core engine is conventional and includes a multistage axial compressor following the fan that receives a portion of fan air 24 which is compressed therein and mixed with fuel in a combustor for generating hot combustion gases which flow downstream through high and low pressure turbines that extract energy therefrom. The high pressure turbine powers the compressor, and the low pressure turbine powers the fan which rotates during operation for producing propulsion thrust to power the aircraft in flight.

Figure 2:
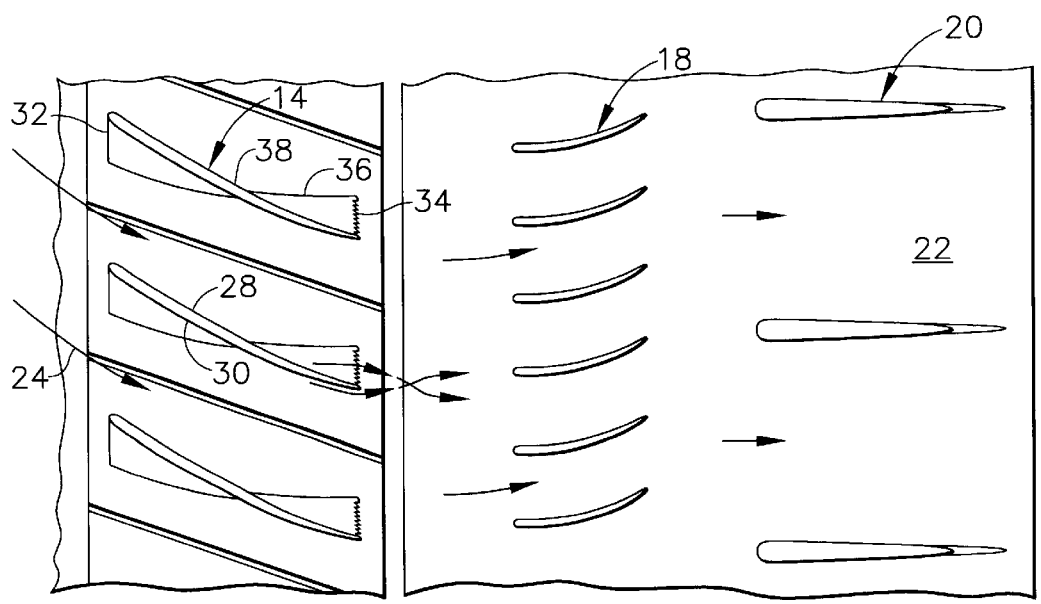
FIG. 2 is planiform view of a portion of the fan illustrated in FIG. 1 and taken along line 2—2.

As shown in FIGS. 1 and 2, the fan air 24 is channeled through the row of fan blades 14 and downstream through the row of stator vanes 18 for discharge from the fan nozzle disposed aft of the supporting struts 20. As the air flows downstream over the individual fan blades, the air is pressurized by the rotary action thereof and wakes are shed from the blades and flow downstream through the deswirl vanes 18.

The wakes from the fan blades interact with the stator vanes which produce unsteady loading thereon and corresponding pressure waves that propagate upstream and downstream at the blade passing frequency and its harmonics. Furthermore, turbulence in the blade wakes also interacts with the downstream stator vanes generating unsteady loading thereon and corresponding sound waves at a wide spectrum of frequencies related to the energy spectrum of the wake turbulence itself.

In accordance with the present invention, the fan blades 14 illustrated in FIGS. 1 and 2 are serrated for enhancing mixing of the wakes shed therefrom upstream from the row of stator vanes for correspondingly reducing fan noise. The fan blades themselves are used in accordance with the present invention for forced mixing of the rotor wakes therefrom for correspondingly reducing the amplitude of those wakes prior to reaching the downstream stator vanes. By increasing the rate of mixing of the rotor wakes shed from the fan blades, the resulting wake amplitude and turbulence levels are correspondingly reduced at the stator vanes, which in turn reduces the stator vane unsteady loading and corresponding noise radiation therefrom.

Figure 3:
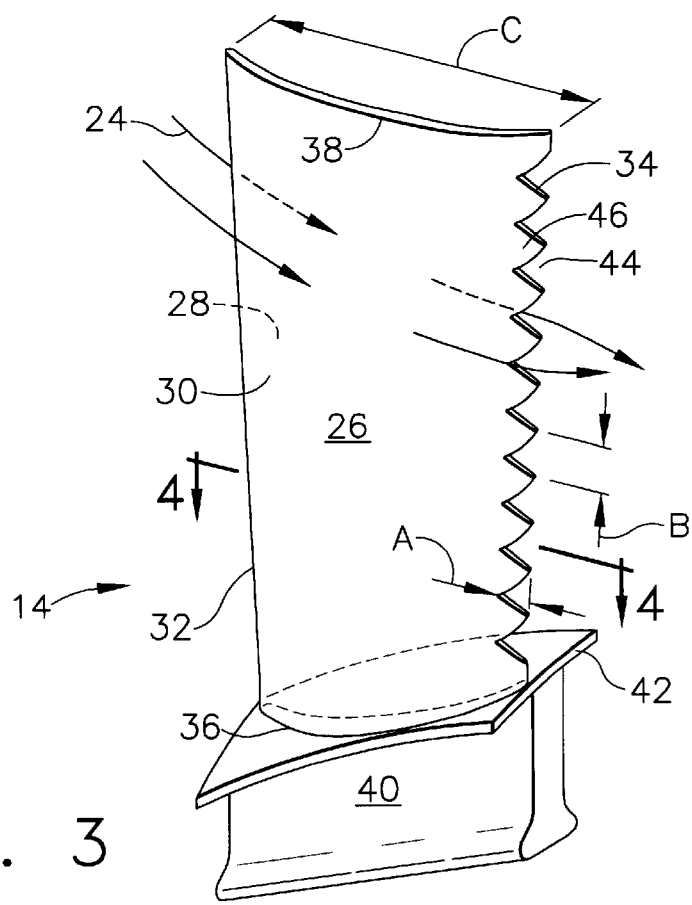
FIG. 3 is an isometric view of an isolated one of the fan blades illustrated in FIGS. 1 and 2 in accordance with an exemplary embodiment of the present invention.

As illustrated in FIGS. 2 and 3, each of the fan blades 14 includes an airfoil 26 having a generally concave pressure side 28 and an opposite generally convex suction side 30 extending axially between leading and trailing edges 32,34 from a radially inner root 36 to radially outer tip 38. Each blade typically includes an integral dovetail 40, as shown in FIG. 3, for mounting the individual blades in a corresponding dovetail slot in the perimeter of a supporting fan rotor disk. And, each blade typically includes a platform 42 disposed at the airfoil root for defining the inner boundary of the fan air, with the platform being either integral with the blade or a separate component mounted between adjacent blades in the fan.

The leading and trailing edges of a typical fan blade are radially straight or arcuate along the airfoil span and bound the axial ends of the airfoil pressure and suction sides. In contrast, the fan blades illustrated in FIG. 3 have a serrated trailing edge which is generally serpentine along the radial span of the airfoil for promoting wake mixing as it is shed downstream from the individual blades for reducing the unsteady loading on the downstream stator vanes to correspondingly reduce fan noise.

Figure 4:
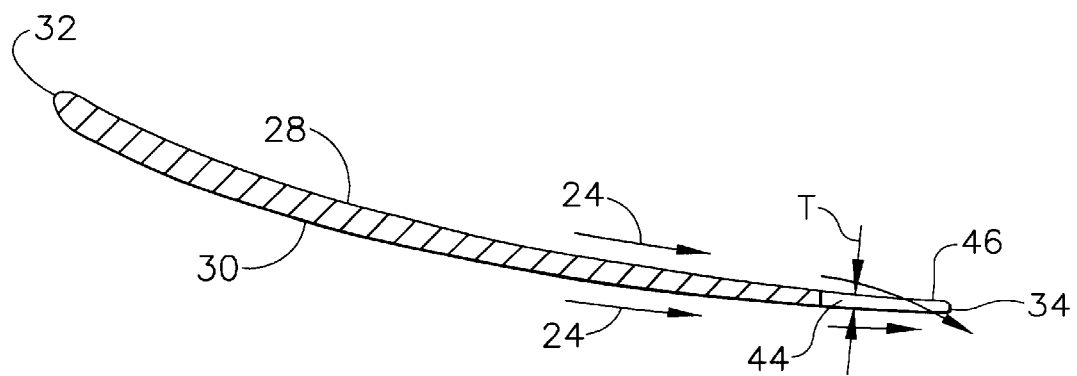
FIG. 4 is a radial sectional view through the blade illustrated in FIG. 3 and taken along line 4—4.

As shown in FIGS. 3 and 4 the serrated trailing edge 34 includes a row of serrations or notches 44 which define individual teeth or chevrons 46 therebetween. The notches thus create a serpentine trailing edge with the chevrons 46 extending aft in the downstream direction, with the notches interrupting the radial continuity of the pressure and suction sides of the airfoil locally along the trailing edge.

As shown in FIG. 4, the airfoil pressure and suction sides 28,30 may have any conventional configuration for pressurizing the fan air during operation. The pressure side 28 is generally concave whereas the suction side 30 is generally convex between the leading and trailing edges of the airfoil for creating different velocity distributions over both sides of the airfoil.

By locally introducing the notches 44 along the trailing edge portion of the airfoil, the two separate boundary layers of air flowing along the pressure and suction sides may be joined in flow communication by the notches and forced mixed by the rotational movement of the chevrons during operation. As the blades rotate during operation, the fan air is channeled axially aft between adjacent blades and in corresponding boundary layers along the opposite pressure and suction sides of each airfoil. The serrated trailing edge increases the effective surface area along which the two boundary layers meet and are mixed thereby.

As shown in FIG. 3 the trailing edge notches 44 preferably diverge in the aft direction, with the adjoining chevrons 46 correspondingly converging in the aft direction. The notches and chevrons are preferably triangular for promoting the generation of vortices as the air boundary layers are shed from the airfoil trailing edges, which vortices increase the mixing of the blade wakes prior to reaching the downstream stator vanes.

The specific configuration of the serrated trailing edge of the fan blades may be tailored for each design application depending upon the particular configuration of the fan blade itself. As shown in FIG. 3, the airfoil has a chord represented by its length C measured at each radial span between the leading and trailing edges of the airfoil. As shown in FIG. 4, the airfoil has camber or curvature between its leading and trailing edges, with the pressure side being generally concave, and the suction side being generally convex. The thickness T of the airfoil may vary between the leading and trailing edges in a typical manner.

The chevrons 46 illustrated in FIG. 3 have an axial length A and a radial pitch spacing B. The length A and pitch B relative to the airfoil chord length C may be optimized for each design application for maximizing aerodynamic performance of the airfoil itself relative to the airfoil without the serrated trailing edge while effectively attenuating fan noise.

In the preferred embodiment, the serrated trailing edge is a local change in configuration of the airfoil limited to the region of the airfoil directly adjacent the trailing edge within about 10% of the chord length therefrom. And, the number and size of the individual chevrons and notches may be selected from high to low density along the trailing edge for maximizing sound attenuation without significantly reducing aerodynamic performance.

In the preferred embodiment illustrated in FIGS. 3 and 4, the chevrons 46 are axially coextensive with the airfoil in a common aerodynamic profile therewith, with the chevrons being tapered similarly with the remainder of the airfoil and decreasing in thickness in the aft direction terminating at the trailing edge. In this way, the airfoil may have substantially the same radial contour with or without the serrated trailing edge, with the serrated trailing edge being introduced by the notches extending along the camber lines of the airfoil. In this embodiment, the pressure side of each chevron 46 remains coextensive with the remaining portion of the pressure side of the airfoil without discontinuity, and similarly, the suction side of each chevron 46 remains coextensive with the remaining portion of the airfoil suction side without discontinuity in the radial profile illustrated in FIG. 4.

In the preferred embodiment illustrated in FIG. 3, the individual chevrons 46 adjoin each other at their respective bases which define the apexes of the intervening triangular notches 44. And, the radially adjoining chevrons extend in a substantially continuous row from the root 26 of the airfoil to the tip 38 thereof along the entire span of the trailing edge of the airfoil.

Figure 5:
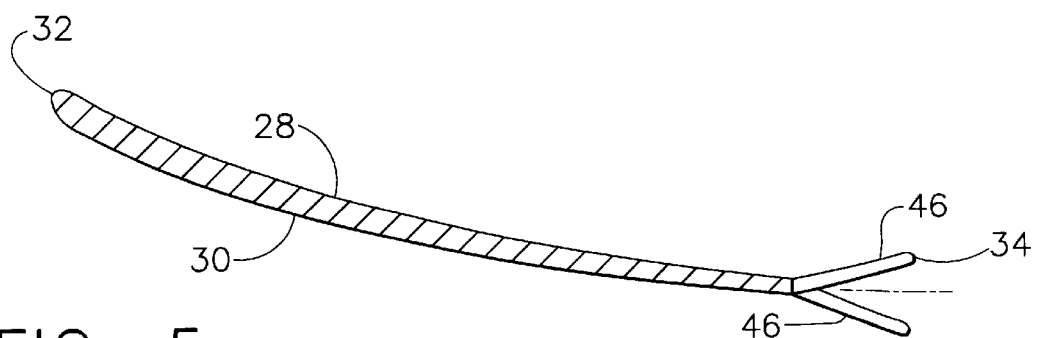
FIG. 5 is a radial sectional view, like FIG. 4, of a fan blade in accordance with another embodiment of the present invention.

FIG. 5 illustrates an alternate embodiment of the chevrons 46 in the airfoil wherein instead of being coextensive with the camber line of the airfoil, illustrated in phantom line, the chevrons are disposed obliquely with the remainder of the airfoil. One or more of the chevrons 46 may be oblique with the pressure side 28 of the airfoil with an obtuse included angle therebetween. One or more of the chevrons 46 may be oblique with the suction side 30 of the airfoil with an included obtuse angle therebetween. Or, the chevrons 46 may alternate obliquely from both sides of the airfoil at the trailing edge in yet another embodiment.

The particular orientation of the individual chevrons may be optimized for each design application depending upon the size and aerodynamic performance of the fan blade. For example, FIG. 2 illustrates that each fan blade 14 typically includes twist from its root 36 to its tip 38, and has corresponding pressure loading varying from root to tip. The individual airfoils have a varying angle of attack with respect to the incoming fan air 24 and shed the fan air wakes at corresponding angles relative to the axial centerline axis of the engine. Accordingly, the specific size, configuration, and angular orientation of the chevrons may be varied for maximizing noise attenuation without compromising aerodynamic performance of the fan blades.

Figure 6:
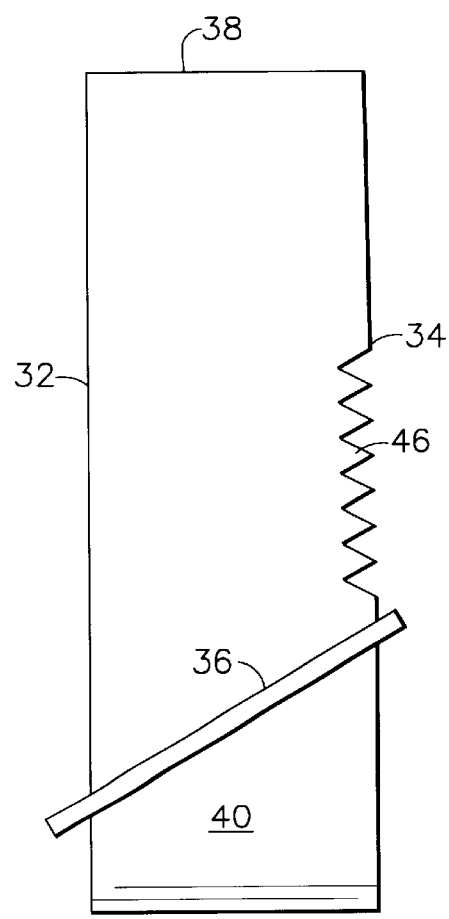
FIG. 6 is a side elevational view of a fan blade in accordance with another embodiment of the present invention.

As illustrated in FIG. 6, each of the airfoils includes an inboard portion from the root 36 to near the mid-span of the airfoil and an outboard portion extending radially outwardly therefrom to the tip 38. The chevrons 46 need not extend along the full trailing edge of the airfoil, but in the exemplary embodiment illustrated in FIG. 6 the chevrons are disposed along primarily only the airfoil inboard portion, with the outboard portion of the trailing edge being devoid of the chevrons adjacent the tip 38.

In this way, the trailing edge from the mid-span to the tip is generally straight or arcuate in a conventional manner, without local interruption by the notches. This inboard embodiment of the serrated trailing edge has particular utility where the pressure loading of the specific fan blades is biased over the inboard span for which the increased mixing effectiveness of the serrated trailing edge is desired.

Furthermore, since the airfoil twists as illustrated in FIG. 2, the length of the aerodynamic streamlines between the fan blades and stator vanes is longer near the blade tips than near the blade roots. The inboard serrated trailing edge may then be used for increasing the mixing effectiveness along the shorter streamlines of the airfoil inboard portions than along the airfoil outboard portions which require little, if any, additional mixing effectiveness.

Figure 7:
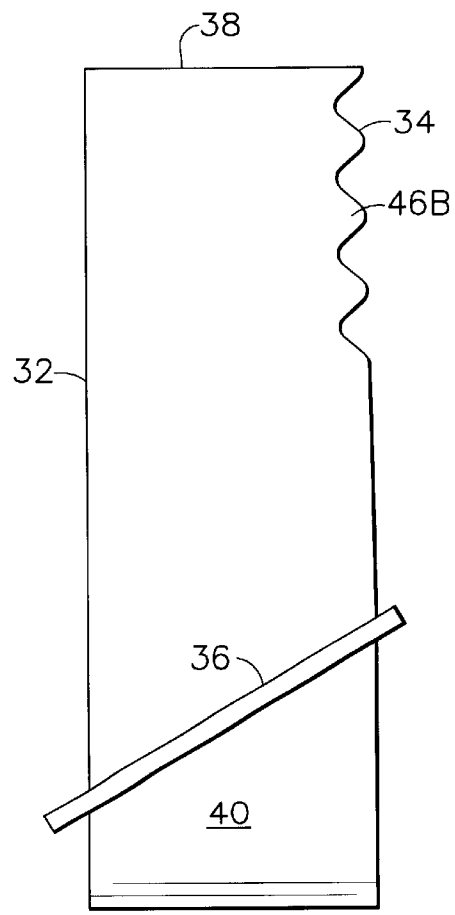
FIG. 7 is a side elevational view of a fan blade in accordance with another embodiment of the present invention.

FIG. 7 illustrates an alternate embodiment of the fan blades in which the chevrons, designated 46B, are disposed along the outboard portion of the airfoil, with the inboard portion of the airfoil being devoid of the chevrons adjacent the airfoil root 36. This embodiment is particularly useful for fan blades in which pressure loading is biased in the outboard portion, and the chevrons are not otherwise required along the inboard portion from the mid-span to the root. In either embodiment illustrated in FIGS. 6 and 7, the radial extent of the serrated trailing edge is limited for limiting pressure losses attributable thereto, while selectively introducing the serrated trailing edge for enhancing noise attenuation.

As indicated above, the chevrons are preferably triangular in configuration, but may have any other suitable configuration which promotes sound attenuation without undesirable pressure losses. For example, the chevrons designated 46B in FIG. 7 and their defining notches are generally sinusoidal with arcuate apexes as opposed to the triangular chevrons and sharp notches illustrated in FIG. 3.

A particular advantage of the forced mixing of the fan wakes and the main fan air channeled between the blades as illustrated in FIG. 2 is the ability to correspondingly decrease the spacing between the fan blades and the stator vanes 18. Since the chevrons promote mixing between the fan blades and vanes the axial spacing therebetween may be correspondingly reduced for a given level of acceptable fan noise. The reduced spacing between the blades and fans permits the entire engine to be correspondingly shorter which in turn reduces the overall weight thereof. In this way, the efficiency of the engine itself is correspondingly improved due to the improved mixing effectiveness of the serrated trailing edges of the fan blades.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A turbofan engine fan blade comprising:
    an airfoil having opposite pressure and suction sides extending axially between leading and trailing edges and radially between an inner root and an outer tip;
    an integral dovetail joined to said airfoil at a platform disposed at said airfoil root;
    said pressure and suction sides being joined in flow communication by a row of notches extending therebetween for interrupting radial continuity thereof along said trailing edge; and
    said notches diverge aft to define therebetween chevrons converging aft in a axial serpentine configuration of said trailing edge, with said chevrons and notches being substantially identical in profile for increasing effective surface area along said trailing edge.

2. A blade according to claim 1 wherein said chevrons are disposed obliquely with said airfoil pressure side.

3. A blade according to claim 1 wherein said chevrons are disposed obliquely with said airfoil suction side.

4. A blade according to claim 1, wherein said airfoil includes inboard and outboard portions extending in span from said root to tip thereof, and said chevrons are disposed along said inboard portion, with said outboard portion being devoid of said chevrons adjacent said tip.

5. A blade according to claim 1 wherein said chevrons are triangular.

6. A blade according to claim 4 wherein said chevrons decrease in thickness aft.

7. A blade according to claim 1 wherein said chevrons adjoin each other in a row.

8. A blade according to claim 1 wherein said chevrons are coextensive with said airfoil in a common aerodynamic profile therewith.

9. A blade according to claim 1 wherein said airfoil includes inboard and outboard portions extending in span from said root to tip thereof, and said chevrons are disposed along said outboard portion, with said inboard portion being devoid of said chevrons adjacent said root.

10. A blade according to claim 1 wherein said chevrons adjoin each other from said root to tip of said airfoil.

11. A turbofan rotor blade comprising an airfoil having a serrated trailing edge including a row of notches defining chevrons therebetween, and wherein said chevrons are disposed obliquely with said airfoil.

12. A blade according to claim 11 wherein said airfoil includes opposite pressure and suction sides, and said chevrons are oblique with said pressure side.

13. A blade according to claim 11 wherein said airfoil includes opposite pressure and suction sides, and said chevrons are oblique with said suction side.

14. A blade according to claim 11 wherein said airfoil includes inboard and outboard portions extending in span from root to tip thereof, and said chevrons are disposed along said inboard portion, with said outboard portion being devoid of said chevrons adjacent said tip.

15. A turbofan comprising:
    a row of fan blades disposed upstream from a row of stator vanes;

each of said fan blades including an airfoil having leading and trailing edges;

said trailing edge is serrated by a row of notches defining chevrons therebetween; and each of said airfoils includes inboard and outboard portions extending in span from root to tip thereof, and said chevrons are disposed along said inboard portion, with said outboard portion being devoid of said chevrons adjacent said tip.

16. A turbofan according to claim 15 wherein said chevrons are triangular and decrease in thickness aft.

17. A turbofan according to claim 15 wherein said airfoil includes opposite pressure and suction sides, and said chevrons are coextensive with both said pressure and suction sides.

18. A turbofan according to claim 15 wherein said chevrons adjoin each other in a row.

19. A turbofan comprising:

a row of fan blades disposed upstream from a row of deswirling stator vanes surrounding a core engine including a multistage axial compressor;

each of said blades including an airfoil having opposite pressure and suction sides extending axially between leading and trailing edges and radially between an inner root and an outer tip;

said airfoil being joined to an integral dovetail at a platform disposed at said airfoil root;

said airfoil pressure and suction sides being joined together in flow communication by a row of notches extending therebetween for interrupting radial continuity thereof along said trailing edge; and said notches diverge aft to define therebetween chevrons converging aft in a serpentine configuration of said trailing edge, with said chevrons and notches being substantially identical in profile for increasing effective surface area along said trailing edge.

20. A turbofan according to claim 19 wherein said chevrons are triangular and decrease in thickness aft.

21. A turbofan according to claim 20 wherein said chevrons are coextensive with both said pressure and suction sides.

22. A turbofan according to claim 21 wherein said chevrons adjoin each other in a row.

23. A turbofan according to claim 22 wherein each of said airfoils includes inboard and outboard portions extending in span from said root to tip thereof, and said chevrons are disposed along said outboard portion, with said inboard portion being devoid of said chevrons adjacent said root.

24. A turbofan according to claim 22 wherein said chevrons adjoin each other from said root to tip of each of said airfoils.

* * * * *

UNITED STATES PATENT AND TRADEMARK OFFICE
CERTIFICATE OF CORRECTION

PATENT NO.     : 6,733,240 B2
DATED          : May 11, 2004
INVENTOR(S)    : Philip R. Gliebe It is certified that error appears in the above-identified patent and that said Letters Patent is hereby corrected as shown below:

Column 6,
Line 1, delete "4" and substitute -- 1 --

Signed and Sealed this

Thirteenth Day of July, 2004

JON W. DUDAS
*Acting Director of the United States Patent and Trademark Office*